Nov. 13, 1962  W. F. GRATTAN  3,063,309
AUTOMATIC TRANSMISSION FOR AUTOMOTIVE VEHICLES
Filed Oct. 9, 1961  3 Sheets-Sheet 1
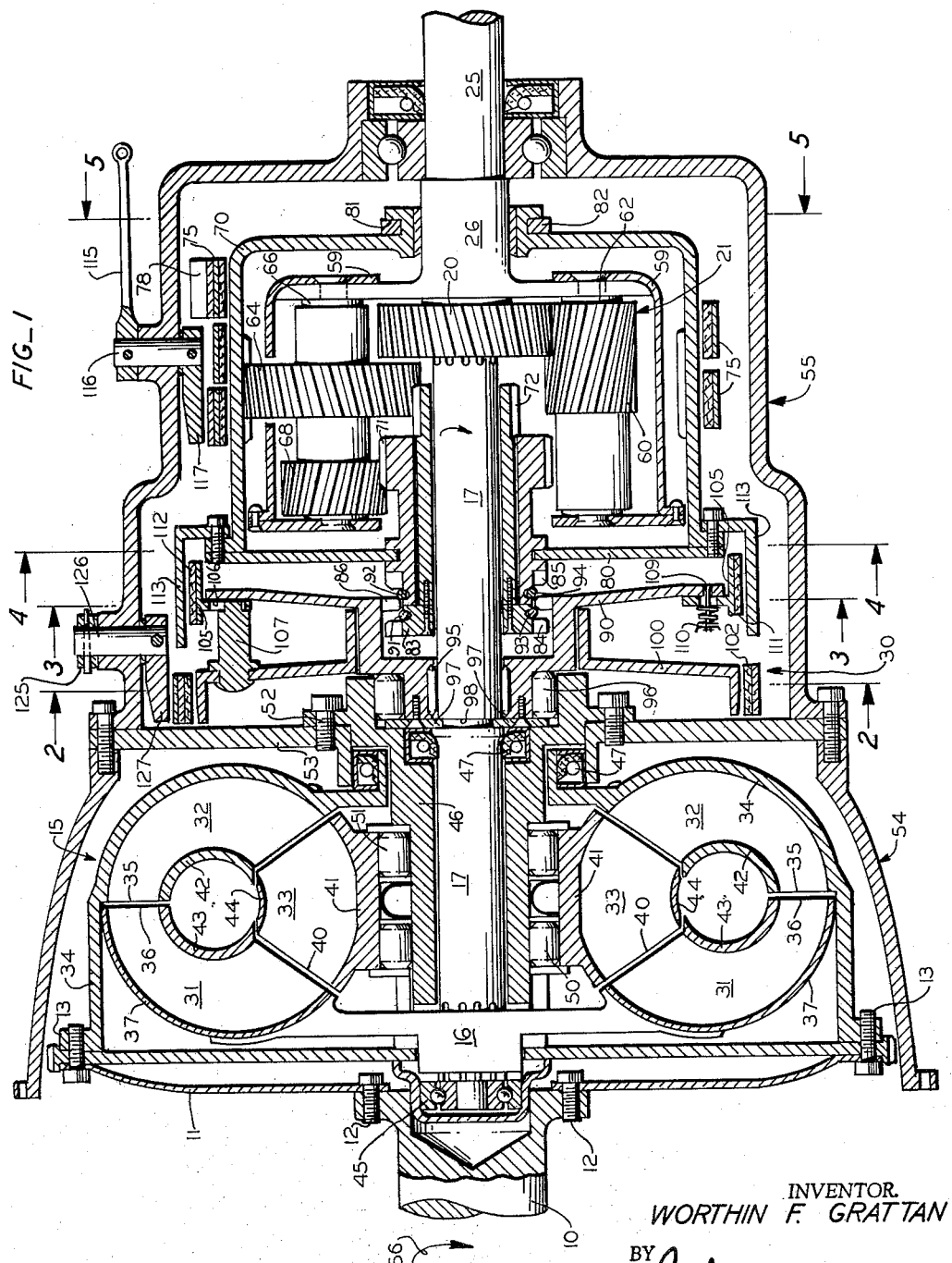
FIG_1
INVENTOR.
WORTHIN F. GRATTAN
BY Jack M. Wiseman
ATTORNEY Nov. 13, 1962 W. F. GRATTAN 3,063,309
AUTOMATIC TRANSMISSION FOR AUTOMOTIVE VEHICLES
Filed Oct. 9, 1961 3 Sheets-Sheet 2
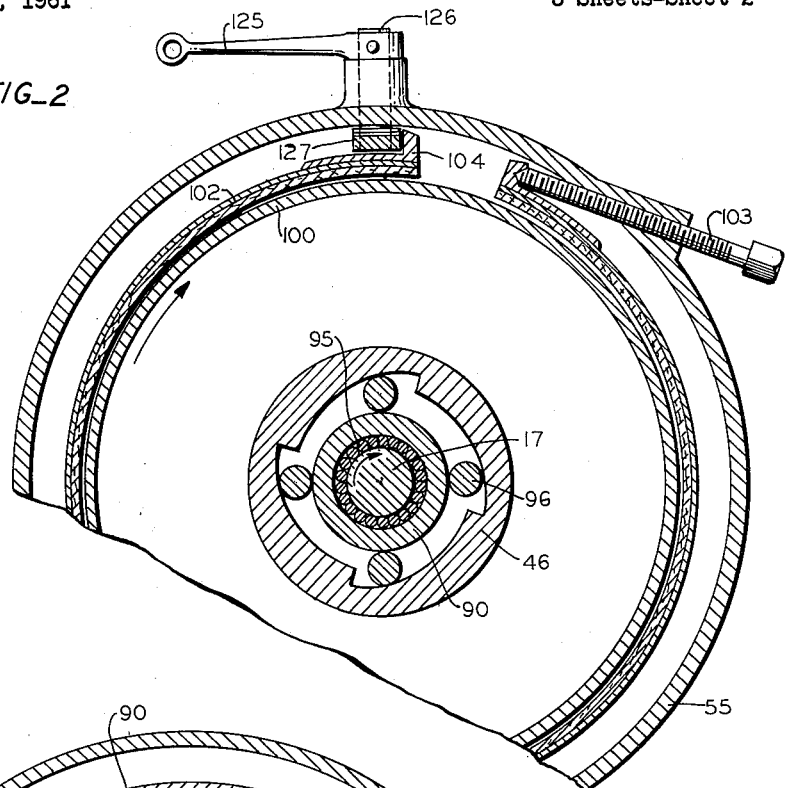
FIG_2
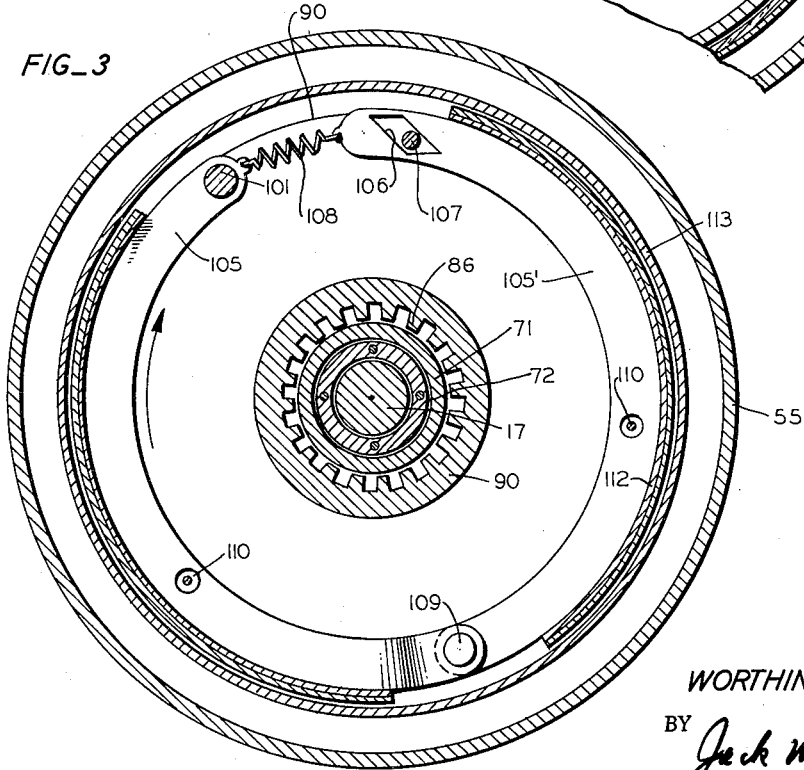
FIG_3
INVENTOR.
WORTHIN F. GRATTAN
BY
Jack M. Wiseman
ATTORNEY Nov. 13, 1962   W. F. GRATTAN   3,063,309
AUTOMATIC TRANSMISSION FOR AUTOMOTIVE VEHICLES
Filed Oct. 9, 1961   3 Sheets-Sheet 3
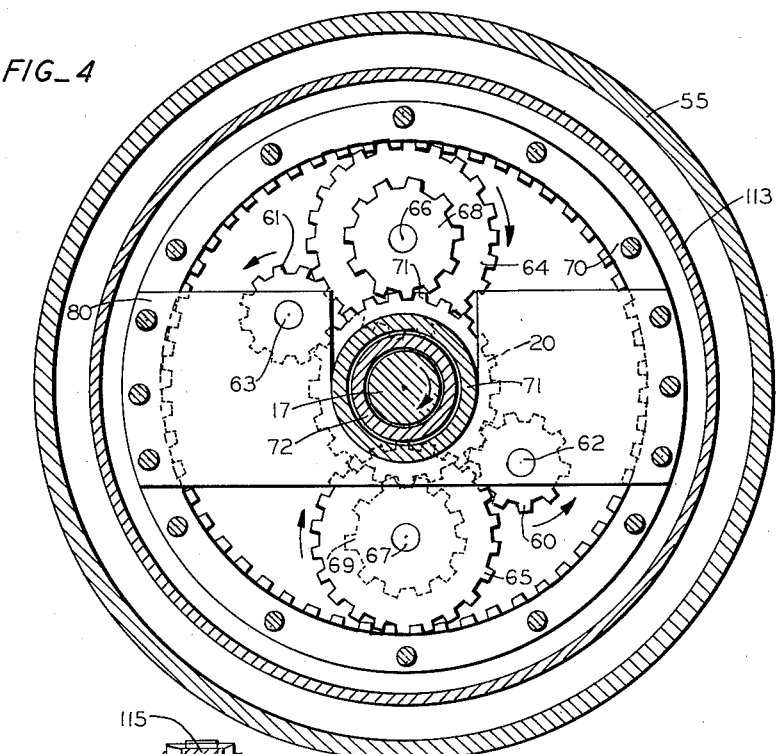
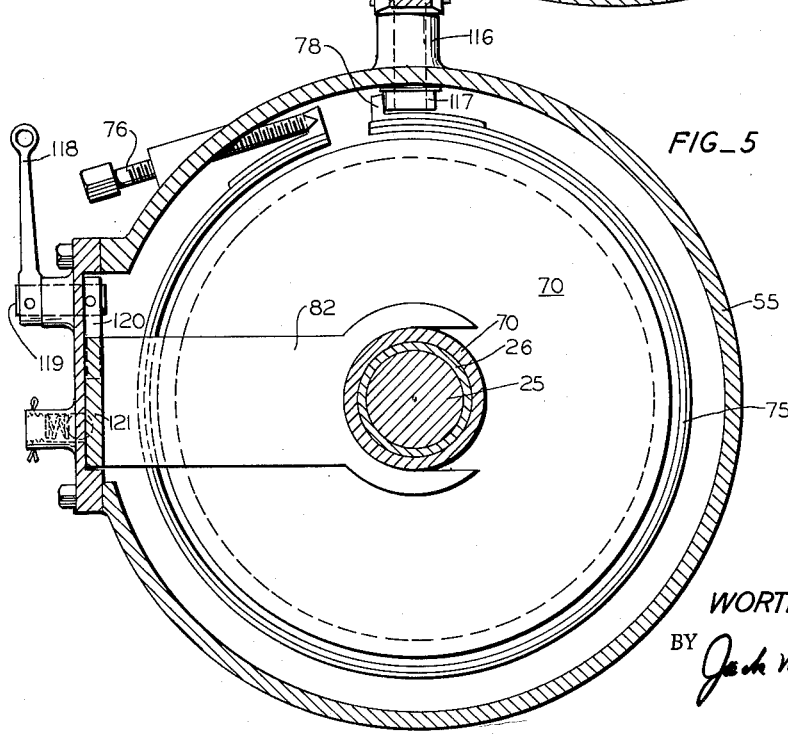
INVENTOR.
WORTHIN F. GRATTAN
BY Jack M. Wiseman
ATTORNEY _United States Patent Office_

3,063,309
Patented Nov. 13, 1962

3,063,309
AUTOMATIC TRANSMISSION FOR AUTOMOTIVE VEHICLES
Worthin F. Grattan, 22450 Summit Road, Los Gatos, Santa Clara County, Calif.
Filed Oct. 9, 1961, Ser. No. 143,811
11 Claims. (Cl. 74—731)

The present invention relates to automatic transmissions for automotive vehicles.

An object of the present invention is to provide an automatic transmission for automotive vehicles which affords an operator positive control over the speed and acceleration of the vehicle and enables improved control over the vehicle by an operator while ascending or descending steep grades.

Another object of the present invention is to provide an automatic transmission for automotive vehicles which improves the maximum acceleration, gradability and hill braking of the vehicle.

Another object of the present invention is to provide an automatic transmission whereby the selection of the power transmission path from the drive to the driven shafts is facilitated.

Another object of the present invention is to provide an automatic gear transmission wherein the gear ratios of a planetary gear system are selective.

Other and further objects and advantages of the present invention will be apparent to one skilled in the art from the following description taken in connection with the accompanying drawings, in which:

FIG. 1 is a diagrammatic longitudinal sectional view of an automatic transmission embodying the present invention.

FIG. 2 is a diagrammatic fragmentary transverse sectional view taken along line 2—2 of FIG. 1 showing a manually operated clutch for the automatic transmission.

FIG. 3 is a diagrammatic transverse sectional view taken along line 3—3 of FIG. 1 illustrating an automatic clutch for the automatic transmission.

FIG. 4 is a diagrammatic transverse sectional view taken along line 4—4 of FIG. 1 to illustrate the planetary transmission gears employed in the automatic transmission of the present invention.

FIG. 5 is a diagrammatic transverse sectional view taken along line 5—5 of FIG. 1 to show an outer reactor gear with brake band and shifting mechanism used in the automatic transmission of the present invention.

Illustrated in FIG. 1 is the automatic transmission of the present invention which comprises a drive shaft 10, such as an engine crankshaft of a vehicle. A disc 11 is secured, adjacent the central opening thereof, to the drive shaft 10 by bolts 12 for rotation therewith. At the peripheral edge thereof, the disc 11 is fixed by bolts 13 to a conventional hydraulic torque converter 15, whereby the torque converter 15 rotates with the disc 11. A flanged hub 16 of the torque converter 15 is fixedly secured to one end of an intermediate shaft 17 that is axially aligned with the drive shaft 10. Hence, rotation of the flanged hub 16 of the torque converter 15 imparts a rotary movement to the intermediate shaft 17.

A sun gear 20 of a planetary gear system 21 is splined to the other end of the intermediate shaft 17, whereby the intermediate shaft 17 transmits torque from the torque converter 15 to the planetary gear system 21. Axially aligned with the intermediate shaft 17 and the drive shaft 10 is a driven shaft 25. The driven shaft 25 is fixed to the hub of a planet cage or carrier 26 so that rotation of the planet carrier 26 rotates the driven shaft 25 therewith. The driven shaft 25 is connected through suitable differential gears, not shown, to the rear wheel of a vehicle for applying a torque thereto. Intermediate the planetary gear system 21 and the torque converter 15 is located a conventional manually operated and automatic clutch 30, which determines in part the power flow path within the planetary gear system 21.

As shown in FIG. 1, the conventional hydraulic torque converter 15 has substantially a toroidal configuration and comprises a turbine 31, a pump 32 and a stator 33. A casing 34 for the pump 32 is secured to the disc 11 by the bolts 13 for rotation therewith. The turbine 31 is connected to the flanged hub 16, which is splined to the intermediate shaft 17 for rotating the same.

A plurality of radially spaced driving vanes 35 are mounted in the interior of the arcuate portion of the pump casing 34 and arranged so that rotation of the casing 34 by the disc 11 and the drive shaft 10 causes fluid contained within the hydraulic converter 15 to impel a plurality of radially spaced driven vanes 36. The driven vanes 36 are carried by a wall 37 of the turbine 31. It is the wall 37 that is connected to the flanged hub 16 for driving the intermediate shaft 17.

The driven vanes 36 are curved so as to direct the fluid impelled thereagainst toward a plurality of radially spaced reactor vanes 40 of the stator 33. The direction of flow for the fluid approaching the reactor vanes 40 is opposite to the direction of travel of the drive shaft 10 and the driving vanes 35. The reactor vanes 40, which are carried by a wall 41 of the stator 33, are arranged to redirect the fluid impelled thereagainst by the driven vanes 36 in the direction of rotation of the drive vanes 35 and toward the driven vanes 36. Arcuate guide elements 42, 43 and 44 for the vanes 35, 36 and 40, respectively, are provided so that the fluid within the torque converter 15 will pass from one set of vanes to another with a minimum of turbulance and slippage.

The intermediate shaft 17 is supported for rotation by suitable roller bearings 45 and rotates independently of the shafts 10 and 25. A sleeve 46 is supported by the intermediate shaft 17. Suitable seals 47 adjacent the sleeve 46 minimize the leakage of fluid from the torque converter 15.

Interposed between the sleeve 46 and the wall 41 of the stator 33 are overrun clutches 50 and 51 which serve to prevent the stator 33 from rotating relative to the sleeve 46 in a direction opposite to the direction of rotation of the drive shaft 10. The sleeve 46 is secured by bolts 52 to a disc 53 which forms a common wall for a stationary housing 54 for the torque converter 15 and a stationary housing 55 for the planetary gear system 21 and the clutch 30. The turbine 31 is supported for rotation by its flanged hub 16, the pump 32 rotates relative to the sleeve 46, and the stator 31 can rotate relative to the sleeve 46 only in the same direction as does the drive shaft 10.

The torque converter 15 operates in a conventional and well known manner. When a predetermined amount of input torque is applied to the torque converter 15 by rotating the drive shaft 10 at a prescribed angular velocity in the direction of an arrow 56, the drive vanes 35 will rotate with the same angular velocity as does the drive shaft 10. Fluid will be impelled by the drive vanes 35 toward the driven vanes 36 to cause the driven vanes 36 to rotate in the same direction as the drive vanes 35 but at a lower angular velocity. Subsequently, the fluid impelled against the driven vanes 36 will be directed toward the reactor vanes 40 in a direction opposite from which the drive vanes 35 and the driven vanes 36 rotate. With the reactor vanes 40 unable to rotate in a direction opposite the direction of rotation of the drive shaft 10, the fluid impelled against the reactor vanes 40 by the driving vanes 36 will be redirected toward the drive vanes 35 to impel the same and increase the force applied thereto for rotating the same.

As the driving vanes 35 continue to rotate, the driven vanes 36 gradually approach the same angular velocity and the flow of fluid toward the reactor vanes 40 gradually lessens. At full operation of the torque converter 15, fluid does not urge the reactor vanes 40 in a direction opposite of the direction of rotation of the drive shaft 10. Hence, the drive vanes 35, the driven vanes 36, and the reactor vanes 40 rotate in the direction of an arrow 56 (FIG. 1) as a unit to effect a fluid coupling through the torque converter 15 between the drive shaft 10 and the intermediate shaft 17.

The torque applied to the intermediate shaft 17 by the torque converter 15 is transmitted to the planetary gear system 21 by way of the sun gear 20 thereof, which is splined to the intermediate shaft 17. As shown in FIGS. 1 and 4, the sun gear 20 of the planetary gear system 21 meshes with a pair of relatively long, narrow planet gears 60 and 61, which are supported for individual rotation by the planet cage or carrier 26 at diametrically opposite points by means of shafts 62 and 63, respectively, and a bracket 59. The bracket 59 is secured to the carrier 26 and supports the projecting ends of the shafts 62 and 63. The long, narrow planet gears 60 and 61 (FIG. 4) mesh with relatively short, wide planet gears 64 and 65, respectively, which are supported for individual rotation by the planet carrier 26 at diametrically opposite points by means of shafts 66 and 67, respectively, and the bracket 59 that supports the projecting ends of the shafts 66 and 67. Also supported for rotation by the shafts 66 and 67 are relatively short, narrow planet gears 68 and 69, which are spaced forwardly from the planet gears 64 and 65, respectively.

It is to be observed that the driven shaft 25 is fixed to the carrier 26 for rotation therewith and the carrier 26 rotates freely relative to the intermediate shaft 17. The carrier 26, the driven shaft 25 and the intermediate shaft 17 are disposed coaxially.

The operation of the planetary gear system 21 is controlled by concentrically disposed reactor gears 70, 71 and 72 thereof. The outer reactor gear 70 (FIGS. 1 and 4) constitutes a ring gear and is supported by bearings for free rotation about the hub of the carrier 26. Further, the reactor gear 70 is arranged to be moved in an axial direction relative to the axis of the planet carrier 26. The inner reactor gear 72, which is in the form of a sun gear, is supported for free rotation by the intermediate shaft 17 by suitable bearings, not shown, and the intermediate reactor gear 71 is supported for free rotation by the inner reactor gear 72 by suitable bearings, not shown.

As illustrated in FIGS. 1 and 4, the reactor gear 70 meshes with the planet gears 64 and 65, but does not mesh with the planet gears 60, 61, 68 or 69. In a like manner, the inner reactor gear 72 meshes with the planet gears 64 and 65, but does not mesh with the planet gears 60, 61, 68 or 69. The intermediate reactor gear 71 meshes with the planet gears 68 and 69, but does not mesh with the planet gears 60, 61, 64 or 65.

A brake band 75 is arranged to engage the exterior surface of the reactor gear 70 (FIGS. 1 and 5). One end of the brake band 75 is anchored by means of an adjustment screw 76 (FIG. 5) that is received in threaded engagement by a suitable threaded opening in the stationary housing 55. At the other end of the brake band 75 is disposed a tab 78. The brake band 75 can be manually shifted to a position engaging the reactor gear 70 and to a position free from engagement with the reactor gear 70 by a mechanism to be described hereinafter, which engages the tab 78 of the brake band.

For sliding the reactor gear 70 axially, the hub of the reactor gear 70 is formed with a circular groove 81 which receives a shifting fork 82 (FIGS. 1 and 5). The shifting fork 82 is actuated by a mechanism to be described hereinafter.

Bolted to the reactor gear 70 is a plate 80 (FIG. 1) which is received by an annular groove of the intermediate reactor gear 71 for sliding the intermediate reactor gear 71 axially relative to the intermediate shaft 17 simultaneously with the manual sliding of the outer reactor gear 70 axially relative to the carrier 26.

A collar 83 (FIG. 1) is secured by screws to the inner reactor gear 72 and is supported for free rotation by the intermediate shaft 17. The intermediate reactor gear 71 abuts at one end the collar 83 and at the other end has a shoulder which is engaged by the inner reactor gear 72 to permit the reactor gear 71 to rotate freely relative to the reactor gear 72 and yet enable the axial shifting of the reactor gear 71 to impart axial movement to the reactor gear 72. The axial shifting of the reactor gear 72, in turn, imparts an axial movement to the collar 83. Thus, there is simultaneous axial shifting of the reactor gear 70, the collar 83, the reactor gear 72 and the reactor gear 71.

Formed on the collar 83 are radially projecting gear teeth 84. Similarly formed on the reactor gear 71 are radially projecting gear teeth 85. Disposed intermediate the teeth 84 and 85 are radially projecting gear teeth 86 which are formed on a plate 90 of the clutch 30. The teeth 86 of the clutch plate 90 are arranged to mesh with the teeth 84 of the collar 83 and to mesh with the teeth 85 of the reactor gear 71 dependent upon the position of the outer reactor gear 70. In FIG. 1, it is to be observed that the teeth 86 of the plate 90 are disposed in a neutral position, since they are centrally located relative to the teeth 84 of the collar 83 and the teeth 85 of the reactor gear 71 and are not in meshing engagement with either the teeth 84 of the collar 83 or the teeth 85 of the reactor gear 71.

An annular groove 91 is formed in the collar 83 and a like annular groove 92 is formed in the reactor gear 71. Disposed within the groove 91 is a conventional synchronizing spring 93 and disposed within the groove 92 is a conventional synchronizing spring 94. The springs 93 and 94 are located adjacent the radially projecting teeth 84 and 85, respectively, to provide for meshing of the teeth without excessive chattering.

The plate 90 of the clutch 30 is supported by roller bearings 95 for free rotation about the intermediate shaft 17. Interposed between the hub of the plate 90 and the sleeve 46 are one-way brakes 96, which serve to prevent the plate 90 from rotating in a direction opposite to the direction of rotation of the drive shaft 10. Secured to the hub of the clutch plate 90 by screws are plates 97 that are received in an annular groove 98 of the intermediate shaft 17 to prevent axial displacement of the plate 90.

Supported by the clutch plate 90 for rotation therewith is a forward brake drum 100 (FIGS. 1 and 2) which is secured thereto by means of a pin 107. Encircling the exterior surface of the brake drum 100 is an arcuate forward brake shoe 102 that is arranged to either engage or disengage the forward brake drum 100. One end of the brake shoe 102 is anchored by an adjustment screw 103 that is received in threaded engagement by a threaded opening in the housing 55. At the other end of the brake shoe 102 is disposed a tab 104 which is actuated by a mechanism to be described hereinafter for controlling the engagement or disengagement of the brake shoe 102 with the brake drum 100.

As shown in FIG. 3, the pin 107 is received by a parallelogram opening 106 formed in an arcuate rearward clutch shoe 105′ to permit relative movement of the clutch shoe 105′ with respect to the plate 90. The other end of the clutch shoe 105′ is pivotally connected by a pin 109 to one end of an arcuate rearward clutch shoe 105. The other end of the clutch shoe 105 is anchored to the clutch plate 90 by means of a pin 101. The facing ends of the clutch shoes 105 and 105′ are connected by a compression spring 108. Retaining springs 110 (FIG. 1) retain the clutch shoes 105 and 105′ in position while permitting relative movement with respect to the plate 90. Glued to the exterior surface of the clutch shoe 105 or otherwise caused to adhere thereto are arcuate clutch bands 111 and 112 (FIG. 3).

Encircling the clutch shoes 105 and 105' is a rearward clutch drum 113 (FIGS. 1 and 3) which is secured by bolts to the outer reactor gear 70. The clutch shoes 105 and 105' are arranged to engage or disengage the clutch drum 113. When the plate 90 rotates in the direction of rotation of the shaft 10 above a predetermined speed, the clutch shoes 105 and 105' move outwardly under centrifugal force, which is permitted by the parallelogram opening 106 and pin 107, causing the clutch bands 111 and 112 to engage the clutch drum 113 and thus establishes a mechanical connection with the outer reactor gear 70. Conversely, when the plate 90 rotates below the predetermined speed, the spring 108 urges the clutch shoes 105 and 105' inwardly, which is permitted by the opening 106 and the pin 107, causing the clutch shoe 105 to disengage the outer reactor gear 70.

The brake band 75 surrounding the outer reactor gear 70, the axial shifting of the outer reactor gear 70 through the shifting fork 82 and the engaging or disengaging of the forward brake shoe 102 with the forward brake drum 100 are controlled by linkage, not shown, in a conventional manner by a well known shifting lever, not shown, that is supported on a steering post of a vehicle. The shifting lever is provided with the following positions: neutral, low, drive and reverse.

More particularly, the linkage connected to the shifting lever includes a lever 115 (FIGS. 1 and 5) which is fixed to one end of an upright shaft 116 that is received by the stationary housing 55 and is supported by the housing 55 for rotation. At the other end of the shaft 116 is fixed a cam 117. Rotation of the shaft 116 activates the cam 117 to cause the brake band 75 by actuating the tab 78 to engage or disengage the exterior surface of the outer reactor gear 70 dependent upon the direction of rotation of the shaft 116.

The shifting lever, not shown, is also arranged through linkage, not shown, which includes a lever 118 (FIG. 5), to shift axially the outer reactor gear 70. For this purpose, the lever 118 is fixed to one end of a horizontally disposed shaft 119 that is supported by the housing 55 for rotation. At the other end of the shaft 119 is attached a cam 120. Rotation of the shaft 119 by the lever 118 causes the cam 120 to rotate, thereby actuating a bar 121 that is operatively connected to the shift fork 82. Movement of the shift fork 82 (FIGS. 1 and 5) in an axial direction relative to the hub of the planet carrier 26 imparts a like movement to the outer reactor gear 70.

Another set of linkage, which includes a lever 125 (FIGS. 1 and 2), is controlled by the shift lever, not shown, for engaging or disengaging the forward brake shoe 102 with the forward brake drum 100. Toward this end, the lever 125 is fixed to one end of a shaft 126 that is supported by the housing 55 for rotation. At the other end of the shaft 126 is attached a cam 127. Rotation of the shaft 126 by the lever 125 actuates the cam 127 for actuating the tab 104 to cause the forward brake shoe 102 to engage or disengage the forward brake drum 100 dependent upon the direction of rotation of the shaft 126.

The operation of the automatic gear transmission system will now be described. When the shifting lever is in the neutral position, the brake band 75 is not in engagement with the outer reactor gear 70. Also, the outer reactor gear 70 is in the position shown in FIG. 1 and the teeth 86 of the clutch plate 90 are neither meshing with the teeth 92 of the intermediate reactor gear 71 nor with the teeth 84 of the collar 83. During the operation of the vehicle engine, the drive shaft 10 is rotating in the direction of the arrow 56. The rotation of the drive shaft 10 rotates the torque converter 15, which, in turn, rotates the intermediate shaft 17 in the direction of the arrow 56. By rotating the intermediate shaft 17, the sun gear 20 is rotated in the direction of the arrow 56. The sun gear 20 meshes with the planet gears 60 and 61 to rotate the same in the direction shown by the arrows in FIG. 4. As previously described, the planet gears 60 and 61 mesh with the planet gears 64 and 65, respectively, to rotate the same in the direction shown by the arrows in FIG. 4. The rotation of the planet gears 60, 61, 64 and 65 will rotate the reactor gears 70, 71 and 72. Since the reactor gears 70, 71 and 72 are free to rotate, no reactive force is created. Consequently, the planet carrier 26 does not rotate and no drive force is applied to the driven shaft 25. Hence, the vehicle will remain stationary with the engine running.

Shifting of the lever to a reverse position causes the brake band 75 to engage the outer reactor gear 70 to hold it stationary, but does not shift the reactor gear 70 in an axial direction. The drive shaft 10, the torque converter 15, the intermediate shaft 17, the sun gear 20 rotate in the clockwise direction, as shown by the arrow 56, in a manner previously described. The rotation of the sun gear 20 rotates the planet gears 60 and 61 in a counterclockwise direction (FIG. 4). By rotating the planet gears 60 and 61 in a counterclockwise direction, the planet gears 64 and 65 rotate in a clockwise direction (FIG. 4). As previously described, the planet gears 64 and 65 mesh with the outer reactor gear 70, which is held stationary by the engagement with the brake band 75. The reactor gears 71 and 72 are free to rotate. As a consequence of locking the outer reactor gear 70, the planet gears 64 and 65 are constrained to move in an epicyclic manner around the outer reactor gear 70 in a counterclockwise direction so as to cause the planet carrier 26 to rotate in a counterclockwise direction. Thus, the driven shaft 25 connected to the carrier 26 rotates in a counterclockwise direction. The torque ratio for the planetary gear system 21 during reverse drive is 1 to 1.60.

In the event the shifting lever is moved to the low position, the brake band 75 is disengaged from the outer reactor gear 70 and the outer reactor gear 70 is shifted toward the left as viewed in FIG. 1. In addition, the forward brake shoe 102 is engaged with the forward brake drum 100. The shifting of the reactor gear 70 to the left moves the collar 83, the reactor gear 72 and the reactor gear 71 to the left as viewed in FIG. 1. Consequently, the teeth 85 of the intermediate reactor gear 71 mesh with the teeth 86 of the clutch plate 90. Thus, the outer reactor gear 70 and the sun reactor gear 72 are free to rotate. However, the intermediate reactor gear 71 is locked and held stationary by the clutch plate 90, the brake drum 100 and the brake shoe 102.

The sun gear 20 will rotate clockwise, as shown by the arrow 56 of FIG. 1, in a manner previously described, and the planet gears 60 and 61 meshing therewith will rotate in the counterclockwise direction (FIG. 4). In turn, the planet gears 64 and 65 meshing with the planet gears 60 and 61, respectively, will be urged to rotate in the clockwise direction. Similarly, the planet gears 68 and 69 supported on the common shafts with the gears 64 and 65, respectively, will be urged to rotate in the clockwise direction. With the intermediate reactor gear 71 held stationary through the action of the brake shoe 102 in engagement with the brake drum 100, the planet gears 68 and 69 are constrained to travel about the intermediate reactor gear 71 in a clockwise direction (FIG. 4). This action causes the planet gear cage 26 to rotate in the clockwise direction, thereby rotating the driven shaft 25 in a clockwise direction. High torque is available in this drive position, since the torque of the driving shaft is multiplied by the torque converter and the planetary gear train. The torque ratio for the planetary gear train under the above conditions is 1 to 2.

When the shifting lever, not shown, is moved to the drive position, the brake band 75 remains disengaged and the forward brake shoe 102 is disengaged from the forward brake drum 100. Further, the outer reactor gear 70 is shifted to the right as viewed in FIG. 1. The shifting of the reactor gear 70 to the right shifts the collar 85 and the inner reactor gear 72 as well as the reactor gear 71 in the same direction. As a result thereof, the teeth 84 of the collar 83 mesh with the teeth 86 of the clutch plate 90. As previously described, the collar 83 is secured to the inner reactor gear 72. Thus, the outer reactor gear 70 and the intermediate reactor gear 71 are free to rotate. However, the inner reactor gear 72 is connected to the clutch plate 90, which can only rotate in the direction of the arrow 56 because of the one-way brakes 96.

The sun gear 20 will rotate clockwise as shown by the arrow 56 of FIG. 1, in a manner previously described, and the planet gears 60 and 61 meshing therewith will rotate in the counterclockwise direction (FIG. 4). In turn, the planet gears 64 and 65 meshing with the planet gears 60 and 61 will rotate in the clockwise direction.

Meshing with the planet gears 64 and 65 is the inner reactor gear 72 which is urged to rotate in a counterclockwise direction. The teeth 84 of the reactor gear 72 meshes with the teeth 86 of the clutch plate 90 to urge the clutch plate 90 to rotate in the counterclockwise direction as shown by the arrow 56, which it cannot do because of the one-way brakes 96. Thus, the inner reactor gear 72 is locked or held stationary. Accordingly, the gears 64 and 65 are restrained from rotating about the axes of their supporting shafts. With the planet gears 64 and 65 restrained by the sun reactor gear 72, the planet gears 64 and 65 are constrained to travel in a clockwise direction (FIG. 4). This action causes the planet gear cage 26 to rotate in the clockwise direction, thereby rotating the driven shaft 25 in a clockwise direction. Starting high torque is available, since the torque of the driving shaft is multiplied by the torque converter and the planetary gear train. The torque ratio for the planetary gear train 21 during this operation is 1 to 1.60.

After a desired speed has been obtained, the accelerator, not shown, of the vehicle may be momentarily released. As a consequence thereof, the momentum of the vehicle initiates temporarily a reverse power path. The driven shaft 25 and the planet carrier 26 continue to rotate in the clockwise direction. The reduction in the speed of clockwise rotation of the sun gear 20 causes gears 60 and 61 to walk clockwise around the sun gear 20 and to rotate clockwise about their own axes. Clockwise rotation of the gears 60 and 61 causes counterclockwise rotation of the gears 64 and 65 and clockwise rotation of the reactor gear 72. As a consequence thereof, the clutch plate 90 rotates in the clockwise direction. This action causes the clutch shoes 111 and 112 to engage the clutch drum that is bolted to the outer reactor gear 70. Thus, the outer reactor gear 70 and the inner reactor gear 72 are locked to the clutch plate 90. The operator once again depresses the accelerator and the sun gear 20 will again rotate in the clockwise direction and attempt to rotate the planet gears 60 and 61 in the manner initially described. The gears 64 and 65 will be urged to rotate in the clockwise direction. The inner reaction gear 72 is locked and the planet gears 64 and 65 are constrained to travel around the inner reactor gear 72 in a clockwise direction. The result is that the planetary gear train rotates substantially as a unit which amounts substantially to a direct drive with a 1 to 1 torque ratio. The travel of the gears 64 and 65 in a clockwise direction causes the planet gear carrier 26 to rotate in a clockwise direction, thereby rotating the driven shaft 25 in a clockwise direction.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. In an automatic gear transmission system, a sun gear supported for rotation about a predetermined axis, a planet carrier supported for rotation about said predetermined axis, a first planet gear supported by said carrier for rotation and disposed in meshing engagement with said sun gear, a gear shaft supported for rotation by said carrier, a second planet gear secured to said gear shaft for rotation therewith and disposed in meshing engagement with said first planet gear, a third planet gear secured to said gear shaft for rotation therewith, a first sun reactor gear supported for free rotation about said predetermined axis and disposed in meshing engagement with said second planet gear, a second sun reactor gear supported for free rotation about said predetermined axis and disposed in meshing engagement with said third planet gear, an outer reactor gear supported for free rotation about said predetermined axis and disposed in meshing engagement with said second planet gear, and means operable to selectively hold either said first sun reactor gear, said second sun reactor gear or said outer reactor gear from rotation for controlling the rotation of said carrier and the torque applied therethrough.

2. In an automatic gear transmission system, a drive shaft, a sun gear secured to said drive shaft for rotation therewith, a planet carrier axially aligned with said drive shaft, a first planet gear supported by said carrier for rotation and disposed in meshing engagement with said sun gear, a gear shaft supported for rotation by said carrier, a second planet gear secured to said gear shaft for rotation therewith and disposed in meshing engagement with said first planet gear, a third planet gear secured to said gear shaft for rotation therewith, a first sun reactor gear supported for free rotation about said drive shaft and disposed in meshing engagement with said second planet gear, a second sun reactor gear supported for free rotation about said drive shaft and disposed in meshing engagement with said third planet gear, an outer reactor gear supported for free rotation by said carrier and disposed in meshing engagement with said second planet gear, and means operable to selectively hold either said first sun reactor gear, said second sun reactor gear or said outer reactor gear from rotation for controlling the rotation of said carrier and the torque applied therethrough.

3. In an automatic gear transmission system, a planet carrier supported for free rotation about a predetermined axis, a gear shaft supported for rotation by said carrier, a first planet gear secured to said gear shaft for rotation therewith, a second planet gear secured to said gear shaft for rotation therewith, a first sun reactor gear supported for free rotation about said predetermined axis and disposed in meshing engagement with said first planet gear, a second sun reactor gear supported for free rotation about said predetermined axis and disposed in meshing engagement with said second planet gear, means for imparting rotary movement to said first planet gear, means operable for selectively holding said first and second sun reactor gears from rotation for controlling the rotation of said carrier and the torque applied therethrough, and a one-way brake operatively connected for selectively holding said first and second sun reactor gears against rotation in only one direction.

4. In an automatic gear transmission system, a drive shaft, a sun gear secured to said drive shaft for rotation therewith, a planet carrier axially aligned with said drive shaft, a first planet gear supported by said carrier for rotation and disposed in meshing engagement with said sun gear, a gear shaft supported for rotation by said carrier, a second planet gear secured to said gear shaft for rotation therewith and disposed in meshing engagement with said first planet gear, a third planet gear secured to said gear shaft for rotation therewith, a first sun reactor gear supported for free rotation by said drive shaft and disposed in meshing engagement with said second planet gear, a second sun reactor gear supported for free rotation by said first sun reactor gear and disposed in meshing engagement with said third planet gear, means operable to shift said first and second sun reactor gears axially, and brake means to selectively hold said first and second sun reactor gears from rotation dependent upon the shifted position of said first and second sun reactor gears for controlling the rotation of said carrier and the torque applied therethrough.

5. In an automatic gear transmission system, a drive shaft, a sun gear secured to said drive shaft for rotation therewith, a planet carrier axially aligned with said drive shaft, a first planet gear supported by said carrier for rotation and disposed in meshing engagement with said sun gear, a gear shaft supported for rotation by said carrier, a second planet gear secured to said gear shaft for rotation therewith and disposed in meshing engagement with said first planet gear, a third planet gear secured to said gear shaft for rotation therewith, a first sun reactor gear supported for free rotation by said drive shaft and disposed in meshing engagement with said second planet gear, a second sun reactor gear supported for free rotation by said first sun reactor gear and disposed in meshing engagement with said third planet gear, an outer reactor gear supported for free rotation by said carrier and disposed in meshing engagement with said second planetary gear, means operable to shift said reactor gears axially, and brake means responsive to the shifted positions of said reactor gears for selectively holding said reactor gears from rotation to control the rotation of said carrier and the torque applied therethrough.

6. An automatic gear transmission system comprising a drive shaft, an intermediate shaft aligned with said drive shaft, a torque converter interconnecting said drive and intermediate shafts for rotating said intermediate shaft in response to the rotation of said drive shaft, a driven shaft aligned with said intermediate shaft, a planet carrier secured to said driven shaft for rotating the same, a first planet gear supported by said carrier for rotation, a sun gear fixed to said intermediate shaft and disposed in meshing engagement with said first planet gear for rotating the same, a gear shaft supported by said carrier for rotation, a second planet gear secured to said gear shaft for rotation and disposed in meshing engagement with said first planet gear, a third planet gear secured to said gear shaft for rotation, a sun reactor gear supported for free rotation by said intermediate shaft and disposed in meshing engagement with said second planet gear, an intermediate reactor gear supported for free rotation by said sun reactor gear and disposed in meshing engagement with said third planet gear, and means operable to selectively hold either said sun reactor gear or said intermediate reactor gear from rotation for controlling the rotation of said carrier and the torque applied to said driven shaft.

7. An automatic gear transmission system comprising a drive shaft, an intermediate shaft aligned with said drive shaft, a torque converter interconnecting said drive and intermediate shafts for rotating said intermediate shaft in response to the rotation of said drive shaft, a driven shaft aligned with said intermediate shaft, a planet carrier secured to said driven shaft for rotating the same, a first planet gear supported by said carrier for rotation, a sun gear fixed to said intermediate shaft and disposed in meshing engagement with said first planet gear for rotating the same, a gear shaft supported by said carrier for rotation, a second planet gear secured to said gear shaft for rotation and disposed in meshing engagement with said first planet gear, a third planet gear secured to said gear shaft for rotation, a sun reactor gear supported for free rotation by said intermediate shaft and disposed in meshing engagement with said second planet gear, an intermediate reactor gear supported for free rotation by said sun reactor gear and disposed in meshing engagement with said third planet gear, an outer reactor gear supported for free rotation by said carrier and disposed in meshing engagement with said second planet gear, means operable to shift said reactor gears, and brake means responsive to the shifted positions of said reactor gears to selectively hold said reactor gears from rotation for controlling the rotation of said carrier and the torque applied to said driven shaft.

8. In an automatic gear transmission system, a planet carrier supported for rotation about a predetermined axis, a planet gear supported by said planet carrier for rotation, a sun reactor gear supported for free rotation about said predetermined axis and disposed in meshing engagement with said planet gear, a ring reactor gear supported for free rotation about said predetermined axis and disposed in meshing engagement with said planet gear, means for imparting rotary movement to said planet gear, and clutch means operable to be in engagement with said sun and ring reactor gears simultaneously for controlling the rotation of said carrier and the torque applied therethrough.

9. In an automatic gear transmission system, a planet carrier supported for rotation about a predetermined axis, a planet gear supported by said planet carrier for rotation, a sun reactor gear supported for free rotation about said predetermined axis and disposed in meshing engagement with said planet gear, a ring reactor gear supported for free rotation about said predetermined axis and disposed in meshing engagement with said planet gear, means for imparting rotary movement to said planet gear, and clutch means disposed in meshing engagement with said sun reactor gear and operable upon being rotated above a predetermined speed for engaging said ring reactor gear for controlling the torque applied through said planetary carrier.

10. In an automatic gear transmission system, a planet carrier supported for rotation about a predetermined axis, a planet gear supported by said planet carrier for rotation, a sun reactor gear supported for free rotation about said predetermined axis and disposed in meshing engagement with said planet gear, a ring reactor gear supported for free rotation about said predetermined axis and disposed in meshing engagement with said planet gear, means for imparting rotary movement to said planet gear, and brake means disposed in meshing engagement with said sun gear operable to hold said sun reactor gear from rotation in one direction and operable to rotate with said sun reactor gear in an opposite direction, said brake means being operable upon rotation above a predetermined speed to engage said ring reactor gear, thereby controlling the torque applied through said planet carrier.

11. An automatic gear transmission system comprising a drive shaft, an intermediate shaft aligned with said drive shaft, a torque converter interconnecting said drive and intermediate shafts for rotating said intermediate shaft in response to the rotation of said drive shaft, a driven shaft aligned with said intermediate shaft, a planet carrier secured to said driven shaft for rotating the same, a first planet gear supported by said carrier for rotation, a sun gear fixed to said intermediate shaft and disposed in meshing engagement with said first planet gear for rotating the same, a second planet gear supported by said carrier for rotation and disposed in meshing engagement with said first planet gear, a sun reactor gear supported for free rotation by said intermediate shaft and disposed in meshing engagement with said second planet gear, a ring reactor gear supported for free rotation by said carrier and disposed in meshing engagement with said second planet gear, means operable to shift said sun reactor gear axially, and clutch means arranged to engage said sun reactor gear in its shifted position and operable upon being rotated above a predetermined speed to be in engagement with said sun reactor gear and said ring reactor gear simultaneously for controlling the rotation of said carrier and the torque applied therethrough.

(References on following page)

References Cited in the file of this patent

UNITED STATES PATENTS

| | | |
|---|---|---|
| 2,414,388 | Orr et al. | Jan. 14, 1947 |
| 2,599,559 | Kelbel | June 10, 1952 |
| 2,601,151 | Keller | June 17, 1952 |
| 2,891,421 | Grattan | June 23, 1959 |
| 2,901,923 | Waclawek | Sept. 1, 1959 |
| 2,924,990 | Orr et al. | Feb. 16, 1960 |
| 2,924,997 | Rodler | Feb. 16, 1960 |
| 2,959,984 | Wickman | Nov. 15, 1960 |